United States Patent [19]
Carlson, Jr. et al.

[11] Patent Number: 5,435,029
[45] Date of Patent: Jul. 25, 1995

[54] CABLE PREPARATION TOOL

[75] Inventors: Robert C. Carlson, Jr., Torrington; Christopher H. Cox, Tolland, both of Conn.; Richard D. Alvey, Jr., Fountain City, Ind.

[73] Assignee: The Siemon Company, Watertown, Conn.

[21] Appl. No.: 194,920

[22] Filed: Feb. 14, 1994

[51] Int. Cl.⁶ .......................... B25F 1/00; H02G 1/12
[52] U.S. Cl. ......................................... 7/107; 81/9.4; 30/90.1; 140/123
[58] Field of Search ............... 81/9.4, 9.44; 7/107; 30/90.1, 91.2; 140/123

[56] References Cited

U.S. PATENT DOCUMENTS

| | | |
|---|---|---|
| 927,345 | 7/1909 | Furlong . |
| 1,957,722 | 5/1934 | Nixon . |
| 2,819,520 | 1/1958 | Eyles . |
| 3,254,407 | 6/1966 | Apa et al. . |
| 3,710,654 | 1/1973 | Halverson et al. . |
| 3,736,606 | 6/1973 | Raum et al. ................ 7/107 |
| 3,800,418 | 4/1974 | Schlueter . |
| 3,875,601 | 4/1975 | Kaufman ................ 7/107 |
| 4,189,799 | 2/1980 | Litehizer, Jr. . |
| 4,451,948 | 6/1984 | Goodrich et al. . |
| 4,480,508 | 11/1984 | Rich . |
| 4,569,128 | 2/1986 | Thomas . |
| 4,620,573 | 11/1986 | Meder ................ 140/123 |
| 4,706,384 | 11/1987 | Schreiber et al. . |
| 4,829,671 | 5/1989 | Cheng . |
| 4,905,373 | 3/1990 | Krampe . |
| 4,986,148 | 1/1991 | Krampe . |
| 5,036,734 | 8/1991 | Morrow . |
| 5,060,329 | 10/1991 | Hudson . |

FOREIGN PATENT DOCUMENTS 1203159  7/1959  France .
2438361  4/1980  France .

Primary Examiner—Bruce M. Kisliuk
Assistant Examiner—Joni Danganan
Attorney, Agent, or Firm—Fishman, Dionne & Cantor

[57] ABSTRACT

A low cost wire stripping tool is presented which comprises a section to remove a portion of the outer insulation jacket covering two, three or four pairs of a new telephonic cable and a second section of the wire stripping tool which is capable of straightening (or flattening) a twisted pair and then capable of separating the straightened, flattened pair by cutting the webbed section of the individual pair.

12 Claims, 4 Drawing Sheets

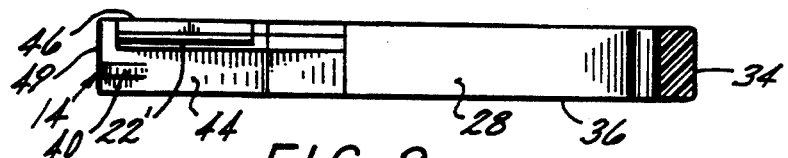
FIG. 9
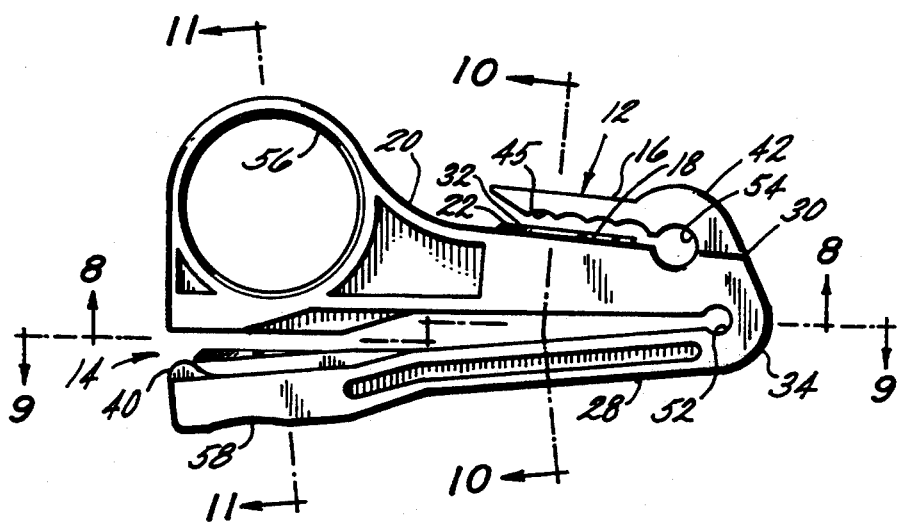
FIG. 5
FIG. 6
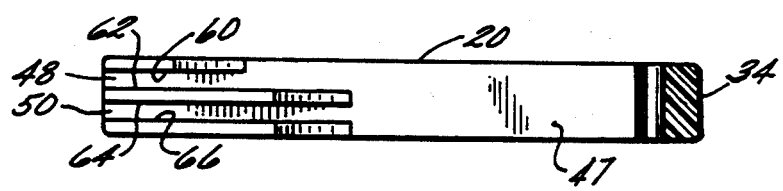
FIG. 8
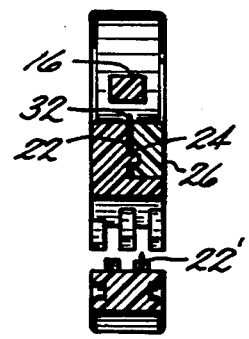
FIG. 10
FIG. 7
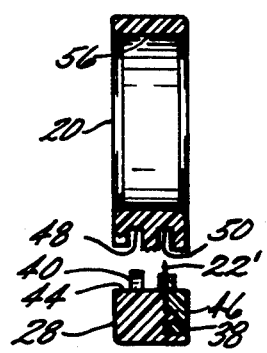
FIG. 11

CABLE PREPARATION TOOL

BACKGROUND OF THE INVENTION

This invention relates to the field of telephonic and other types of communication and data wire stripping tools. More particularly, this invention relates to a new and improved wire stripper particularly suited to the stripping of multiple conductor communication cable, which contains multiple twisted pairs of wire where each pair is jacketed together by a common layer of insulation.

Communication system and/or network efficiency is directly dependent upon the integrity of the connector scheme employed. Such connector schemes include, for example, standard interfaces for equipment/user access (outlet connector), transmission means (horizontal and backbone cabling), and administration/distribution points (cross-connect and patching facilities). Regardless of the type or capabilities of the transmission media used for an installation, the integrity of the wiring infrastructure is only as good as the performance of the individual components and cable that bind it together.

By way of example, a non-standard connector or pair scheme may require that work area outlets be rewired to accommodate a group move, system change, or an installation with connecting hardware and cable whose installed transmission characteristics are compatible with an existing application but are later found to have inadequate performance when the system is expanded or upgraded to higher transmission rates. Accordingly, connecting hardware and cable without properly qualified design and transmission capabilities, can drain user productivity, compromise system performance and pose a significant barrier to new and emerging applications.

Reliability, connection integrity and durability are also important considerations, since wiring life cycles typically span periods of ten to twenty years. In order to properly address specifications for, and performance of telecommunications connecting hardware and cable, it is preferred to establish a meaningful and accessible point of reference. The primary reference, considered by many to be the international benchmark for commercially based telecommunications components and installation, is standard ANSI/EIA/TIA-568 (TIA-568) Commercial Building Telecommunications Wiring Standard. A supplement Technical Systems Bulletin to TIA-568 is TIA/EIA TSB40 (TSB40), Additional Transmission Specifications for Unshielded Twisted-Pair Connecting Hardware and cable. Among the many aspects of telecommunications cabling covered by these standards are connecting hardware design, reliability and transmission performance. Accordingly, the industry has established a common set of test methods and pass/fail criteria on which performance claims and comparative data may be based.

To determine connecting hardware and cable performance in a data environment, it is preferred to establish test methods and pass/fail criteria that are relevant to a broad range of applications and connector types. Since the relationship between megabits and megahertz depends on the encoding scheme used, performance claims for wiring components that specify bit rates without providing reference to an industry standard or encoding scheme are of little value. Therefore, it is in the interest of both manufacturers and end users to standardize performance information across a wide range of applications. For this reason, application independent standards, such as TIA-568 and TSB40, specify performance criteria in terms of hertz rather than bits per second. This information may then be applied to determine if requirements for specific applications are complied with. For example, many of the performance requirements in the IEEE 802.3i(10BASE-T) standard are specified in megahertz (MHz), and although data is transmitted at 10 Mbps for this application, test "frequencies" are specified in the standard (as high as 15 MHz).

Transmission parameters defined in TSB40 for unshielded twisted pair (UTP) connectors include attenuation and near-end crosstalk (NEXT) and return loss.

Connector attenuation is a measure of the signal power loss through a cable and connector at various frequencies. It is expressed in decibels as a positive, frequency dependent value. The lower the attenuation value, the better the attenuation performance. Since connecting hardware is generally considered to be electrically short relative to the length of cabling between two active devices (i.e., up to 100 meters of cable is typically allowed), the attenuation performance of the connecting hardware is usually not a major performance consideration.

Connector crosstalk is a measure of signal coupling from one pair to another within a connector at various frequencies. Since crosstalk coupling is greatest between transmission segments close to the signal source, near-end crosstalk (as opposed to far-end) is generally considered to be the worst case. Although measured values are negative, near-end crosstalk (NEXT) loss is expressed in decibels as a frequency dependent value. The higher the NEXT loss magnitude, the better the crosstalk performance.

Connector and cable return loss is a measure of the degree of impedance matching between the cable and connector. When impedance discontinuities exist, signal reflections result. These reflections may be measured and expressed in terms of return loss. This parameter is also expressed in decibels as a frequency dependent value. The higher the return loss magnitude, the better the return loss performance.

Since most high speed transmission applications that are designed for use with twisted-pair cabling do not operate in a full duplex mode (i.e., transmit and receive signals are not carried over the same pair), the effects of signal reflections, as caused by connectors, are generally not significant with respect to the ability of the twisted pair cabling to support existing applications that are designed for use with twisted pair cabling. However, for future high speed applications that may employ full duplex transmission, connector and cable return loss pose a significant limitation unless properly controlled.

The net effect of these parameters on channel performance may be expressed in signal-to-noise ratio (SNR). For connecting hardware and cable, the parameter that has been found to have the greatest impact on SNR is near-end crosstalk.

Several industry standards specifying multiple performance levels of UTP cabling components have been established. For example, Category 3, 4 and 5 cable and connecting hardware are specified in EIA/TIA TSB-36 & TIA/EIA TSB40 respectively. In these specifications, transmission requirements for Category 3 components and cable are specified up to 16 MHz. They will typically support UTP voice and IEEE 802 series data applications with transmission rates up to 10 Mbps, such as 4 Mbps Token Ring and 10BASE-T.

Transmission requirements for Category 4 components and cable are specified up to 20 MHz. They will typically support UTP voice and IEEE 802 series data applications with transmission rates up to 16 Mbps, such as Token Ring.

Transmission requirements for Category 5 components and cable are specified up to 100 MHz. They are expected to support UTP voice as well as emerging video and ANSI X3T9 series data applications with transmission rates up to 100 Mbps, such as 100 Mbps Twisted-Pair Physical Media Dependent (TP-PMD) and 155 Mbps a synchronous transfer for mode (ATM) applications.

In order for a UTP connector and cable to be qualified for a given performance category, it must meet all applicable transmission requirements regardless of design or intended use. The challenge of meeting transmission criteria is compounded by the fact that connector categories apply to worst case performance. For example, a work area outlet that meets Category 5 NEXT requirements for all combinations of pairs except one, which meets Category 3, may only be classified as a Category 3 connector (provided that it meets all other applicable requirements).

There is constant need to design even better and innovative cable for the telephonic and communication industry as the aforementioned discussion clearly indicates. Such a "state of the art" recently developed cable is represented typically by Belden Wire and Cable Company's "Belden ® Data Twist 350 Twisted Pair" cables, U.S. patent application Ser. No. 08/032,149 filed Mar. 17, 1993. The design and manufacturing process of this cable allows stable electrical performance to 350 MHz, more than triple the verified frequency range of the EIA/TIA 568 Category 5 standard. This cable displays superior performance characteristics across the frequency range. Compared with the current Category 5 standard, impedance and structural return loss are improved up to 50%, while capacitance unbalance is enhanced by 400%. The new cable's stable performance across the frequency range assures satisfactory performance in all of today's current applications, as well as at extended frequencies which might result from future networking needs. A 35% improvement in Resistance Unbalance results in a significant improvement in signal integrity. In addition, a 5% improvement in attenuation provides a stronger, more accurate signal with less energy being lost as it travels down the conductors within the cable. This new cable, further, has the advantage of (1) uniform conductor to conductor spacing, (2) uniform twisting of insulated conductors into pairs, and (3) assurance that the twists of the pairs will not loosen up during manufacture or installation.

This new Belden cable is produced such that there are four twisted wire pairs jacketed by a layer of insulation. The wire pairs are composed of the two conductors surrounded by insulation. The wire pairs are twisted about each other at varying "lays" or rates of twist. The unique feature of this cable is that one common piece of insulation surrounds both the conductors of each wire pair. Prior art cable on the market is composed of wire pairs where each conductor has its own separate individual layer of insulation. Use of this new cable requires the following operations in order to make efficient and speedy connections. In operation (1) the outer layer of insulation (that layer which encloses the four pair of conductors) must be removed. Once the desired section of outer insulation is removed, four wire pairs are exposed that require further operations prior to making the necessary connections. The four wire pairs are twisted in very specific and different lays and are also twisted around one another. Of course, this new cable can also be produced as two or three pair cable as well.

There are prior art wire strippers which can be used to remove the outer layer of insulation covering a four pair telephonic or communication wire. However, such prior art tools do not have any capability to straighten or flatten the pair of twisted cable or any means to sever the webbed insulation of the individual pair. To accommodate and work with newer cables such as the Belden type Data Twist 350 and the like, a new tool is needed.

SUMMARY OF THE INVENTION

The above-discussed and other problems and deficiencies of the prior art are overcome or alleviated by the wire stripping tool of the present invention. In accordance with the present invention, a low cost wire stripping tool is provided which comprises a first section to remove a portion of the outer insulation jacket covering the four twisted pairs of the telephonic cable and a second section of the tool for straightening (or flattening) the individual pairs and separating the webbed section of the individual wires of a particular pair. It should be noted that the present invention works equally well on cable with two or three pairs.

Thus, the wire stripper of this invention combines the removal of the outer insulation of the twisted four pair and the subsequent straightening or flattening operations of the twisted pairs and separation of the two conductors within the individual pair in a single tool so as to minimize the number of tools an installer of cable must carry on his/her person. Also, the tool is lightweight and of relatively low cost.

The above discussed and other features and advantages of the present invention will be appreciated and understood by those of ordinary skill in the art from the following detailed discussion and drawings.

BRIEF DESCRIPTION OF THE DRAWINGS

Referring now to the drawings, wherein like elements are numbered alike in the several figures:

FIG. 5 is a right side elevation view of the device of FIG. 1;

FIG. 6 is a rear end elevation view of the device of FIG. 1;

FIG. 7 is a bottom plan view of the device of FIG. 1;

FIG. 8 is a cross-sectional plan view along the line 8—8 of FIG. 5;

FIG. 9 is a cross-sectional rear view along the line 9—9 of FIG. 5;

FIG. 10 is a cross-sectional elevation view along the line 10—10 of FIG. 5;

FIG. 11 is a cross-sectional elevation view along the line 11—11 of FIG. 5;

DESCRIPTION OF THE PREFERRED EMBODIMENT

Figure 1:
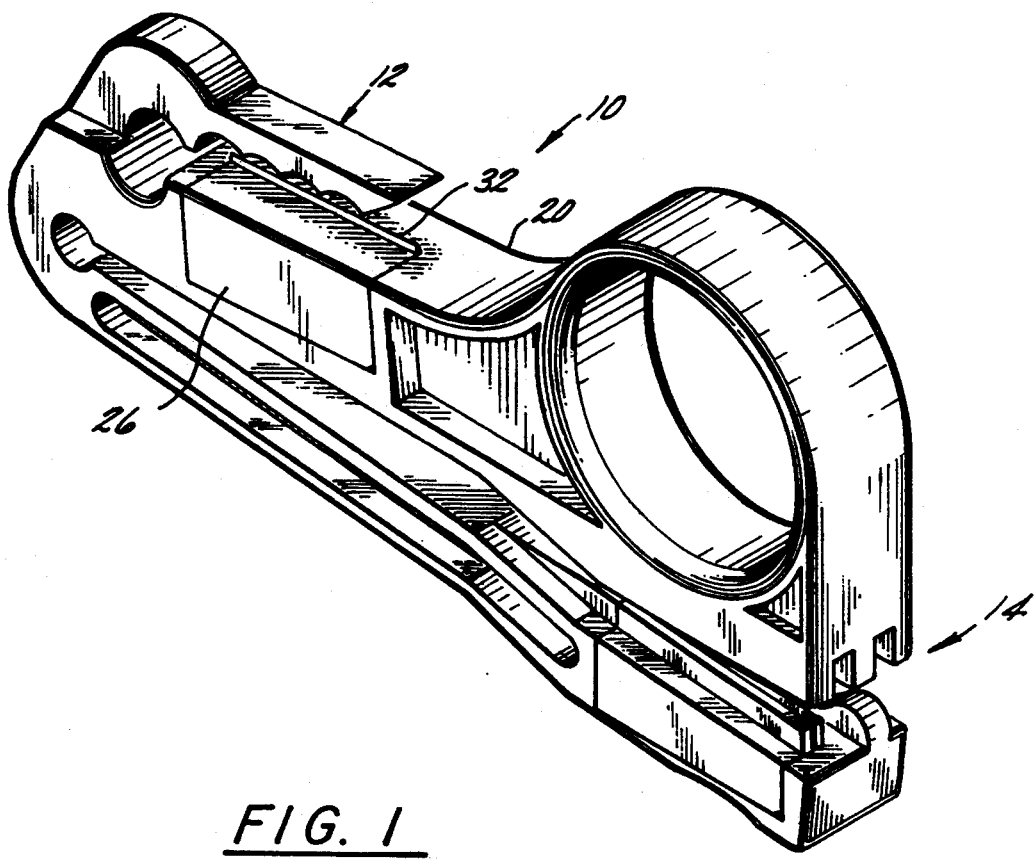
FIG. 1 is a perspective view of the wire stripping tool in accordance with the present invention.
Figure 2:
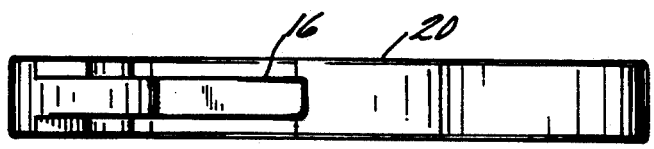
FIG. 2 is a top plan view of the device of FIG. 1.
Figure 3:
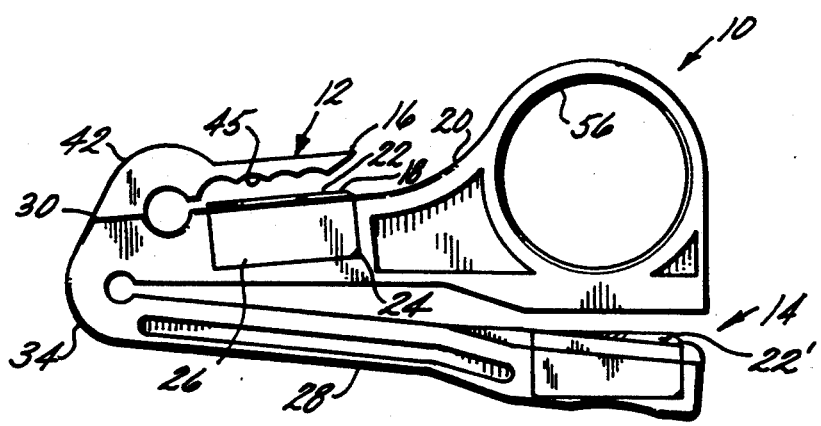
FIG. 3 is a left side elevation view of the device of FIG. 1.
Figure 4:
FIG. 4 is a front end elevation view of the device of FIG. 1.

Referring to FIGS. 1-11, the wire stripping tool of the present invention is shown generally at 10. Device 10 is comprised of two main sections including an outer jacket removal section 12 and wire straightening and web slitting section 14.

Outer jacket removal section 12 is comprised of cable holding jaw 16 and cutting segment 18. Cutting segment 18 is contained within index finger arm 20. Cutting segment 18 contains a standard half injection blade 22 which is inserted into cavity 24 of index finger arm 20. A half injector blade cover 26 is preferably ultrasonically welded to secure injector blade 22 in place. Cable holding jaw 16, index finger arm 20, and thumb arm 28 are preferably made of a one piece injection molded plastic. Cable holding jaw 16 joins index finger arm 20 at the end 30 of index finger arm 20. Cutting segment 18 and edge 32 of injector blade 22 face in opposition (or 180°) to cable holding jaw 16. Cable holding jaw 16 has an end 42 which arcuately joins end 30 of index finger arm 20. Cable holding jaw 16 has a face that is made up of a multiplicity of arcuate teeth 45 (preferably four) which are designed to grip the outer jacket of a section of cable.

Thumb arm 28 extends from end 34 which is spaced apart from end 30. Thumb arm 28 is angularly extended away from end 30 of index finger arm 20 and end 34 of thumb arm 28 at preferably a 5 degree angle. Thumb arm 28 is comprised of three sections, a flexible end 34, connecting arm 36 and wire straightening and web slitting section 14. Wire straightening and web slitting section 14 is comprised of a half injector blade 22' secured with a half injector blade cover 46' in cavity 38, preferably ultrasonically welded in place in thumb arm 28. It should be noted that half injector blade 22' is preferably identical to the half injector blade 22 found in cutting segment 18 of outer jacket removal section 12.

The wire straightening portion of wire straightening and web slitting section 14 is a curved circular protrusion 40 near the end of thumb arm 28. Curved circular protrusion 40 begins at end 49 of thumb arm 28, extends in a radius, or arcuately away from, end 42 a short distance toward end 34, and then descends towards inside face 44 of thumb arm 28. Curved circular protrusion 40 blends arcuately into face 44 of thumb arm 28 beyond the radius of curved protrusion 40. Of course other suitable shapes may be used to form curved circular protrusion 40.

On the inside face 47 of index finger arm 20 are formed two slots 48, 50 which extend preferably 1" to 1½". The width and depth of both slots 48, 50 are sized to receive a single twisted pair each for straightening and slitting. Slot 48 is bounded by surfaces 60, 62 and a portion of surface 47; slot 50 is bounded by surfaces 64, 66 and a portion of surface 47 (see FIG. 8).

Stress relief and flexibility bore 52 is located near the end and spaced apart from end 34 of thumb arm 28 and end 30 of index finger arm 20. Stress relief and flexibility bore 54 is located near the end 42 of cable holding jaw 16 and blended into the area adjacent to cutting segment 18 of index finger arm 20 spaced apart from end 30 of index finger arm 20.

Figure 12:
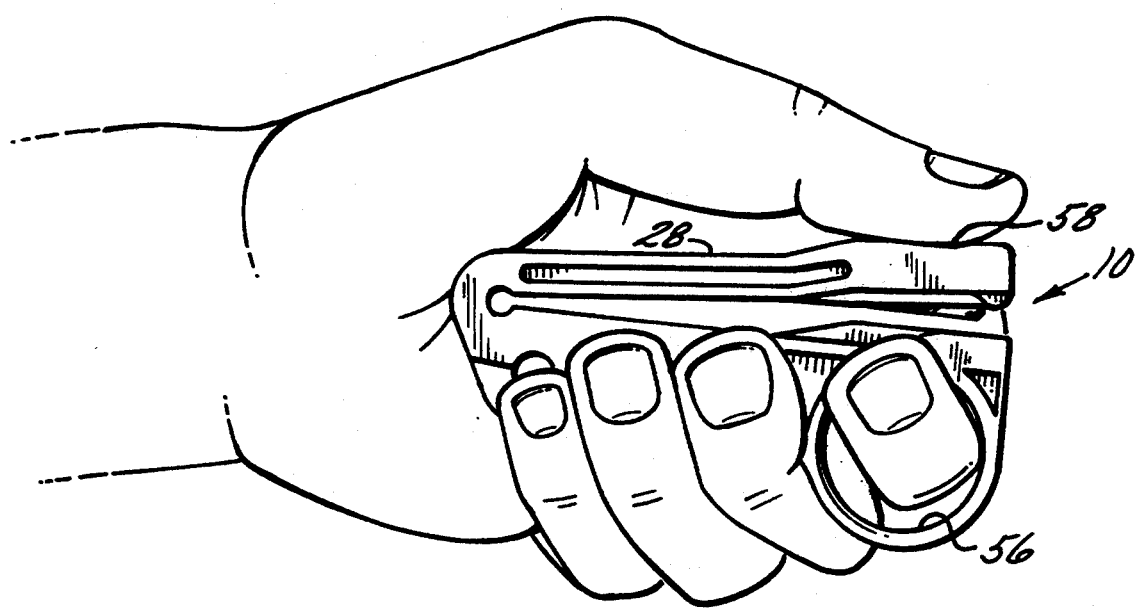
FIG. 12 is a perspective view of the device of FIG. 1 showing how the device fits conveniently in a hand for the straightening and separation operations of FIGS. 13D-F.

Large index finger bore 56 located near the end of index finger arm 20 allows for easy and comfortable insertion and use of the index finger (best seen in FIG. 12). Thumb depression 58, located near the end of thumb arm 28 allows for comfortable and convenient positioning for the thumb. FIG. 12 is a perspective view of the device of the present invention and shows how the device fits conveniently in the operator's hand for the straightening and separation operations shown in detail sequentially in FIGS. 13D-F.

Figure 13A:
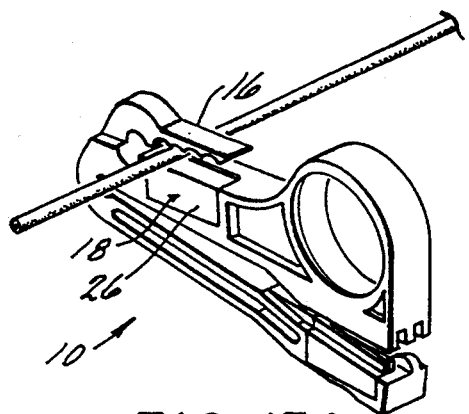
FIGS. 13A-C are perspective sequential views of the device of FIG. 1 showing the steps for removing the outer jacket of the four pair telecommunication cable.
Figure 13D:
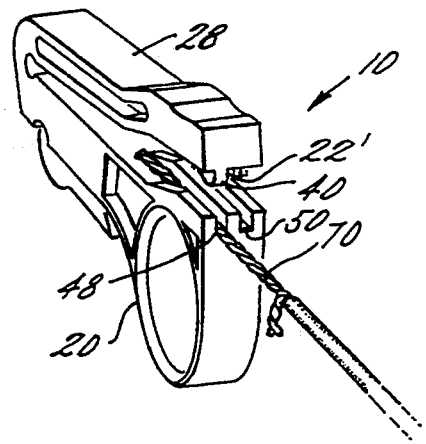
FIGS. 13D-F are perspective sequential views of the device of FIG. 1, showing the steps for flattening or straightening one of four pairs of the cables and separating the web between the two conductors of that pair.
Figure 13B:
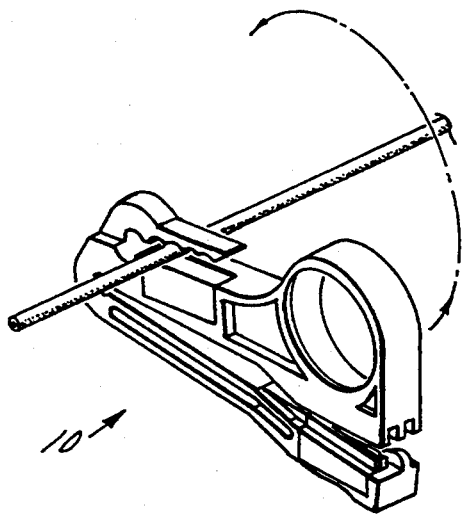
Figure 13E:
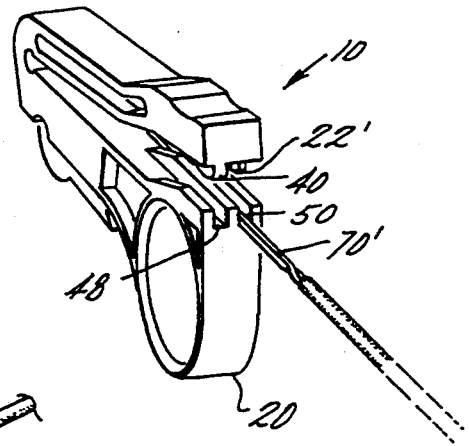
Figure 13C:
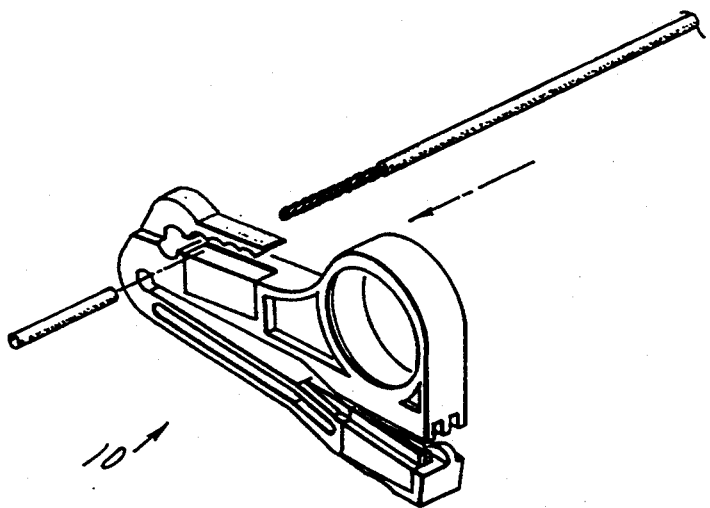

Referring now to FIGS. 13A-C, the operation of the wire stripping tool of the present invention for the removal of the outer jacket of 2, 3 and 4 pair cable without damaging the inner conductor insulation is described. In FIG. 13A, the length of jacket to be removed is determined and the cable is inserted so it fits between cable holding jaw 16 and cutting segment 18. Rotate wire stripping tool 10 around the cable at least one complete revolution (see FIG. 13B). Remove the wire stripping tool and pull the outer jacket from the free end of the cable (see FIG. 13C).

Referring now to FIG. 13D, an appropriate length of a twisted wire pair 70 is inserted into slot 48. Wire stripping tool 10 is squeezed closed and wire stripping tool 10 and twisted wire pair 70 are then pulled in opposite directions. Wire pair 70 is thus squeezed between slot 48 of index finger arm 20 and protrusion 40 of thumb arm 28. This action causes the twisted pair 70 to become untwisted, straightened and flattened.

Figure 13F:
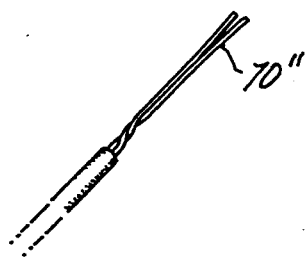

Referring now to FIG. 13E, an appropriate length of the twisted wire pair 70' which is now flattened and straightened is inserted into slot 50 of wire stripping tool 10. Again, wire stripping tool 10 is squeezed closed and wire stripping tool 10 and wire pair 70' are then pulled in opposite directions. Wire pair 70' is thus squeezed between slot 48 of index finger arm 20 and half injector blade 22' of thumb arm 28. This action causes the separation of the wire pair 70 for termination. FIG. 13F shows the pair 70' after the completion of the aforementioned operation of FIG. 13E, separated and ready for termination.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A tool for cable of the type comprising multiple pairs of twisted pair wire comprising:
   a housing having first and second arm portions, each of said arm portions having first and second ends, said arm portions including opposing inner surfaces having cooperating (a) straightening means for straightening or flattening a pair of twisted pair wires and (b) separating means for separating a straightened pair of twisted pair wire into separate, individual wires.

2. The tool of claim 1 wherein:

said straightening means comprises an elongated first slot extending inwardly from said first end of said first arm and an elongated arcuate protrusion extending upwardly and inwardly from a first end of said second arm.

3. The tool of claim 1 wherein:
said separating means comprises a blade extending upwardly and inwardly from said first end of said second arm and an elongated second slot extending inwardly from said first end of said first arm.

4. The tool of claim 2 wherein:
said separating means comprises a blade extending upwardly and inwardly from said first end of said second arm and an elongated second slot extending inwardly from said first end of said first arm.

5. The tool of claim 4 wherein:
said first and second slots are mutually parallel and are defined by three spaced walls rising upwardly from said first arm.

6. The tool of claim 1 wherein:
said first and second arms are integrally and resiliently joined at said respective second ends and radially diverge from each other towards respective first ends.

7. The tool of claim 6 wherein:
said first and second arm diverge at an angle of about 5 degrees.

8. The tool of claim 1 including:
a thumb grip on an outer surface of said second arm opposed from said inner surface and near said first end.

9. The tool of claim 1 including:
cable insulation stripping means.

10. The tool of claim 9 wherein:
said stripping means is positioned on said first arm.

11. The tool of claim 10 wherein said stripping means comprises:
a stripping arm extending angularly from said first arm and being resiliently attached to said first arm, said stripping arm including a plurality of arcuate recesses for supporting cable of varying diameter; and
a blade extending from said first arm in alignment with said arcuate recesses of said stripping arm.

12. The tool of claim 11 including:
a circular finger grip in said first arm for rotating said tool during a stripping procedure.

* * * * *